US005926356A

United States Patent [19]

Sakich et al.

[11] Patent Number: 5,926,356

[45] Date of Patent: Jul. 20, 1999

[54] END TERMINALS FOR MODULAR ELECTRICAL ASSEMBLIES WITH PRESSURE RELIEF

[75] Inventors: John D. Sakich, Wadsworth; Viorel Berlovan; Dennis W. Lenk, both of Medina, all of Ohio

[73] Assignee: Hubbell Incorporated, Orange, Conn.

[21] Appl. No.: 08/902,633

[22] Filed: Jul. 29, 1997

[51] Int. Cl.[6] .......... H02H 9/04

[52] U.S. Cl. .......... 361/127; 361/117

[58] Field of Search .......... 361/117, 118, 361/126, 127

[56] References Cited

U.S. PATENT DOCUMENTS

| | | | |
|---|---|---|---|
| 3,283,196 | 11/1966 | Parker | 156/195 |
| 3,850,722 | 11/1974 | Kreft | 156/172 |
| 4,282,557 | 8/1981 | Stetson | 361/117 |
| 4,404,614 | 9/1983 | Koch et al. | 361/128 |
| 4,463,405 | 7/1984 | Koch et al. | 361/135 |
| 4,656,555 | 4/1987 | Raudabaugh | 361/117 |
| 4,812,944 | 3/1989 | Eberhard et al. | 361/127 |
| 4,905,118 | 2/1990 | Sakich | 361/117 |
| 5,043,838 | 8/1991 | Sakich | 361/117 |
| 5,050,032 | 9/1991 | Thevenet et al. | 361/117 |
| 5,113,306 | 5/1992 | Veverka et al. | 361/127 |
| 5,581,428 | 12/1996 | Smith | 361/119 |

OTHER PUBLICATIONS

Ohio Brass Catalog 94 “Dyna Var PDV–65 and PDV–100 Distribution Class Surge Arresters”, 1988 (No Month).

*Primary Examiner*—Ronald W. Leja

*Attorney, Agent, or Firm*—Jerry M. Presson; Mark S. Bicks

[57] ABSTRACT

A modular electrical assembly is enclosed in an elastomeric weathershed housing, and has a plurality of electrical components and end terminals aligned in a column and in electrical connection with one another via their axially-directed ends and under an axially-directed compressive force via a non-conductive filament winding. The filament winding defines a crisscross pattern with lateral openings for venting gas upon failure of one of the electrical components. The openings can be filled with fracturable epoxy or other insulating materials. Each end terminal has an electrically conductive part with a radially extending flange at its inner end, and an electrically insulative part mounted over the electrically conductive part and engaging the flange.

22 Claims, 2 Drawing Sheets

FIG. 3
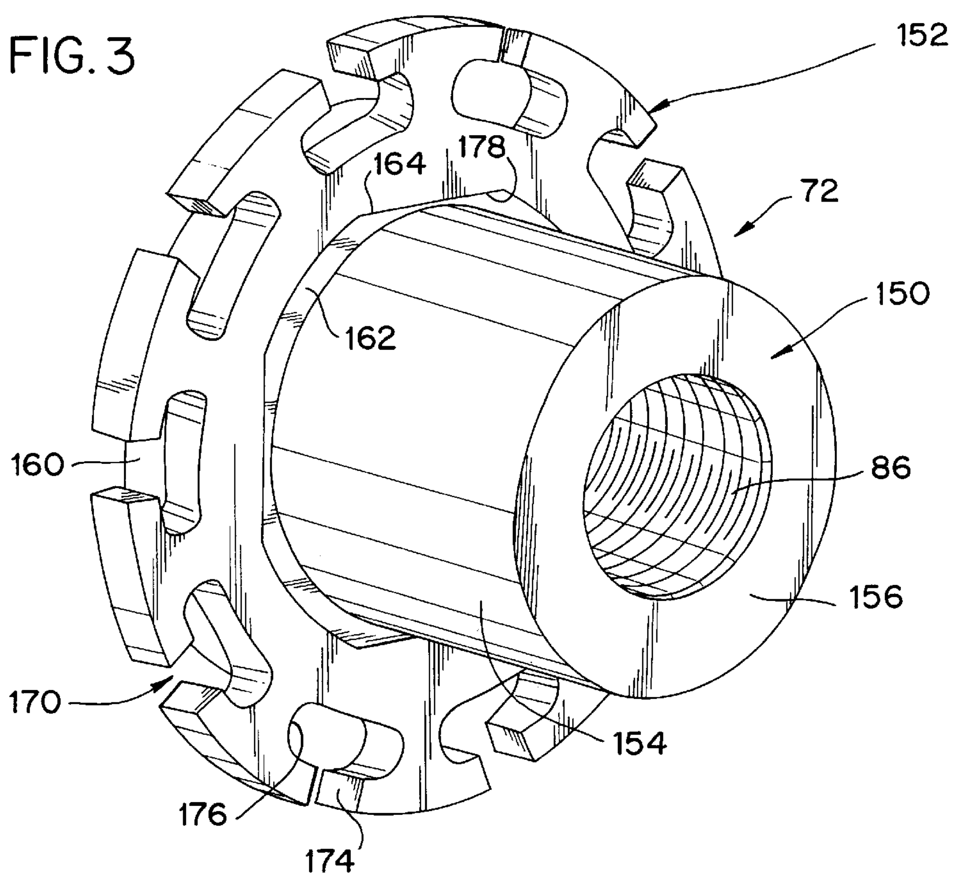
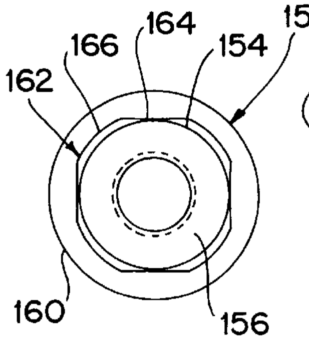
FIG. 4
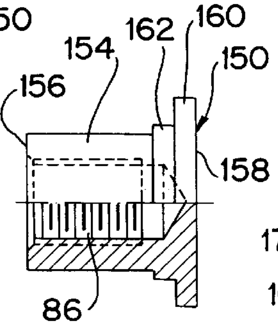
FIG. 5
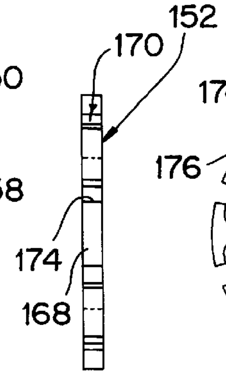
FIG. 6
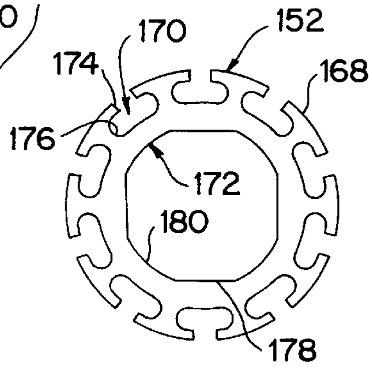
FIG. 7

END TERMINALS FOR MODULAR ELECTRICAL ASSEMBLIES WITH PRESSURE RELIEF

FIELD OF THE INVENTION

The present invention relates to end terminals for polymer housed electrical assemblies which are formed as modules and which can be selectively coupled together at adjacent end terminals to vary the overall electrical rating of the device. Each electrical assembly is formed from electrical components and end terminals that. are wrapped with a non-conductive filament winding in a pattern with lateral openings for relieving gas pressure. The components can be varistors, resistors, capacitors, or any combination thereof. The end terminals include a non-conductive ring forming a shoulder to engage the winding for applying a compression force on the components and end terminals.

BACKGROUND OF THE INVENTION

A surge protector or arrester is commonly connected across a comparatively expensive piece of electrical equipment to shunt over-current surges. Such over-current surges occur, for example, when lightning strikes. When this happens, the surge arrester shunts the surge to ground, thereby protecting the piece of electrical equipment and the circuit from damage or destruction.

Present day surge arresters commonly include an elongated, hollow cylindrical housing and a plurality of nonlinear resistive blocks within the housing. Some of these structures also include spark gaps, the blocks and gaps being electrically interconnected to handle voltage and current surge conditions arising on a power line. The blocks commonly contain silicone carbide (SIC) or metal oxide varistors (MOV), and are usually in the shape of relatively short cylinders stacked within the arrester housing. The number of blocks employed is a function of the material (SIC or MOV) and the voltage and current ratings of the assembly.

For a surge arrester to function properly, intimate contact must be maintained between the MCV or SIC blocks. This necessitates placing an axial load on the blocks within the housing. Some prior art arresters utilize bulky contact springs within the housing to provide this axial load. Typically, these springs can provide only relatively small loads, for example, about sixty pounds. As a result, prior art surge arresters experience one or more problems such as poor heat transfer between the MOV or SIC blocks and arrester terminals; non-uniform current distribution, and high contact resistances at joints. Furthermore, units having low contact force sputter and the ionized metal which is produced can cause axial flashover at high currents.

An additional problem with surge arresters of the prior art is that they, on rare occasions, fail in a dangerous fashion. When these arresters fail and experience high fault currents producing high internal gas pressures, the bursting unit may throw parts and cause property damage.

In addition, some of the prior art devices are difficult to assemble, have poor dielectric design, are susceptible to water invasion, and require totally different devices to provide varied voltage ratings.

Examples of prior art surge arresters are disclosed in the following U.S. Pat. No: 2,587,587 to Bellezza et al; U.S. Pat. No. 2,947,903 to Westrom; U.S. Pat. No. 2,997,529 to Fink; U.S. Pat. No. 3,018,406 to Innis; U.S. Pat. No. 3,261,910 to Jacquier; U.S. Pat. No. 3,412,273 to Kennon et al; U.S. Pat. No. 3,524,107 to Reitz; U.S. Pat. No. 3,566,183 to Olsen; U.S. Pat. No. 3,567,541 to Kaczerginski; U.S. Pat. No. 3,586,934 to Nakata; U.S. Pat. No. 3,706,009 to Reitz; U.S. Pat. No. 3,725,745 to Zisa; U.S. Pat. No. 3,850,722 to Kreft; U.S. Pat. No. 3,973,172 to Yost; U.S. Pat. No. 3,987,343 to Cunningham et al; U.S. Pat. No. 4,029,380 to Yonkers; U.S. Pat. No. 4,092,694 to Stetson; U.S. Pat. No. 4,100,588 to Kresge; U.S. Pat. No. 4,107,567 to Cunningham et al; U.S. Pat. No. 4,161,012 to Cunningham; U.S. Pat. 4,218,721 to Stetson; U.S. Pat. No. 4,404,614 to Koch et al; U.S. Pat. No. 4,467,387 to Bergh et al; U.S. Pat. No. 4,491,687 to Kaczerginski et al; and U.S. Defensive Publication T102,103, as well as U.K. patents 730,710; 1,109,151; and 1,505,875.

In the surge arresters of commonly assigned U.S. Pat. No. 4,656,555 to Raudabaugh, the subject matter of which is hereby incorporated by reference, resin soaked glass fibers completely surround and axially compress the varistor blocks. This complete enclosure of the varistor blocks may not permit the gases generated upon varistor block failure to escape to the weathershed housing interior and then out of the weathershed housing before the gas pressure becomes too great and causes the assembly to break apart. If the filament wrap is relatively thin, the wrap can be burned through or can split before an extremely high pressure develops.

Commonly assigned U.S. Pat. No. 5,013,838 to Sakich, the subject matter of which is hereby incorporated by reference, discloses modular electrical assemblies enclosed in an elastomeric housing and having electrical components and end terminals axially compressed by a non-conductive filament winding. The winding is wrapped in a crisscross pattern with lateral openings for venting gas upon failure of one of the electrical components. The metal end terminals are formed by a relatively complex and costly process with radial flanges having notches. The all metallic end terminals developed high electrical stresses in the assembly, particularly in high voltage applications in contaminated environments.

The notched flanges guide the wrapping of the filament winding, and are machined to meet the close tolerances required for proper assembly with the weathershed housing. The machining creates sharp corners, intensifying electrical stresses in the area of the end terminal flange.

SUMMARY OF THE INVENTION

Accordingly, an object of this invention is to provide end terminals for electrical assemblies and electrical assemblies with end terminals, particularly surge arresters, which can vent gases generated upon electrical component failure to minimize damage, are relatively simple and inexpensive to manufacture, have good dielectric and electric designs, resist water invasion, and have nodular components and housings to simply vary voltage ratings.

A further object of this invention is to provide electrical assemblies, such as surge arresters, having high axial loadings, thereby resulting in uniform current distribution, low contact resistances at joints, and excellent heat transfer to the arrester terminals.

Another object of this invention is to provide an electrical assembly, such as a surge arrester, having a shatter-proof housing which has a high-impact strength and which does not fail in a dangerous fashion.

Still another object of this invention is to provide a MOV block assembly with greatly improved tensile and cantilever strengths.

Yet another object of this invention is to provide an end terminal for a surge arrester and surge arrester with end terminals which is forgiving of dimensional variations in associated parts, thereby reducing the need for expensive close tolerances.

The foregoing objects are basically obtained by an end terminal for a modular electrical assembly comprising an electrically conductive first part and an electrically insulative second part. The first part has an axially extending portion with inner and outer ends, and a radially extending flange at the inner end. The second part is mounted over the axially extending portion and engages the flange.

The foregoing objects are also basically attained by providing a modular electrical assembly including a plurality of conductive electrical components aligned in a row or column and electrically connected through their axially directed ends, first and second end terminals located at the column opposite ends and a non-conductive fiber filament winding wrapped about the electrical components and the end terminals. Each end terminal has an electrically conductive first part and an electrically insulative second part. The first parts have axial portions with inner and outer ends and radially extending flanges at their inner ends. The second parts are mounted over the axial portions and engage the flanges. The winding is wrapped in a predetermined pattern longitudinally and crosswise, applies an axially directed compressive force through the second parts and the flanges on the electrical components to maintain their electrical connection, and forms a pattern with lateral openings therein for venting gases generated upon failure of one of the electrical components.

By forming the end terminals and the electrical assembly in this manner, each of the end terminal parts can be simple and inexpensively formed separately and the assembled. Each first part will maintain the necessary electrical connection. Each second part have the required shape without development of high electrical stresses.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this original disclosure:

FIG. 3 is an enlarged perspective view of an end terminal of the assembly illustrated in FIG. 1;

FIG. 4 is an end elevational view of the first part of the end terminal of FIG. 3;

FIG. 5 is a side elevational view, partially in section, of the first part of the end terminal taken along line 5—5 of FIG. 4;

FIG. 6 is a side elevational view of the second part of the end terminal of FIG. 3; and FIG. 7 is a front elevational view of -he second part of the end terminal of FIG. 6.

DETAILED DESCRIPTION OF PREFERRED EMBODIMENT

Figure 1:
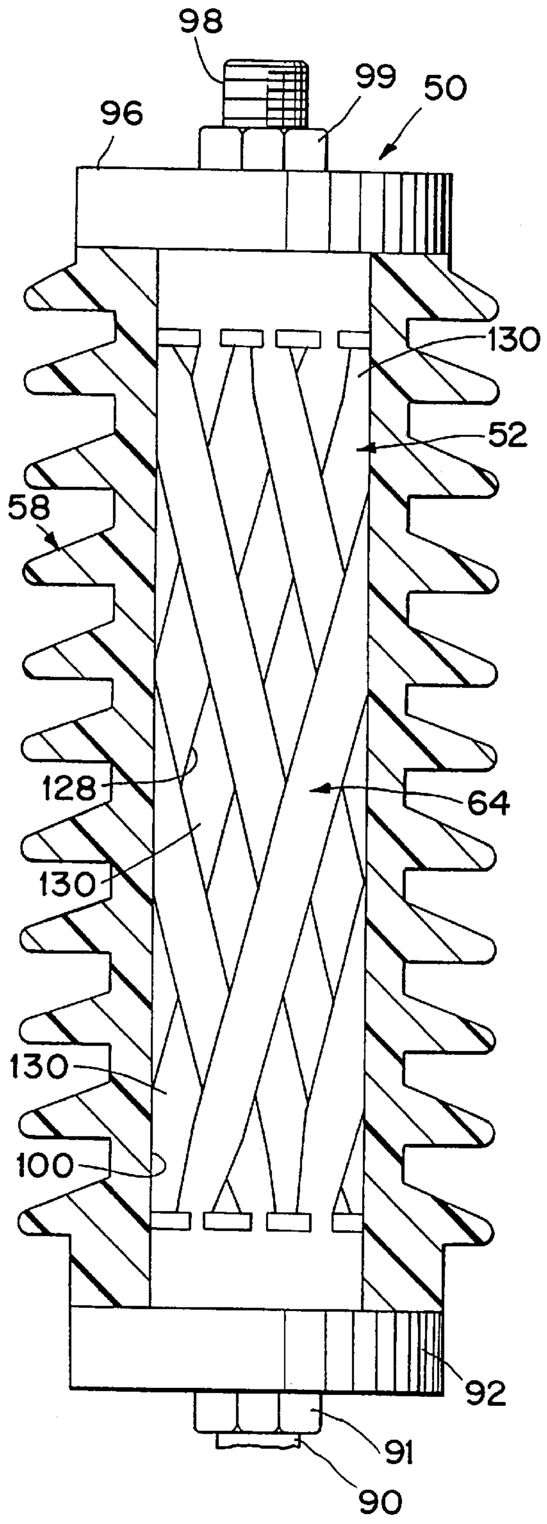
FIG. 1 is a side elevational view in partial section of a modular electrical assembly arrester, in accordance with a modular electrical assembly in the form of a surge arrester, in accordance with the present invention, illustrating the outer surface of the filament winding.
Figure 2:
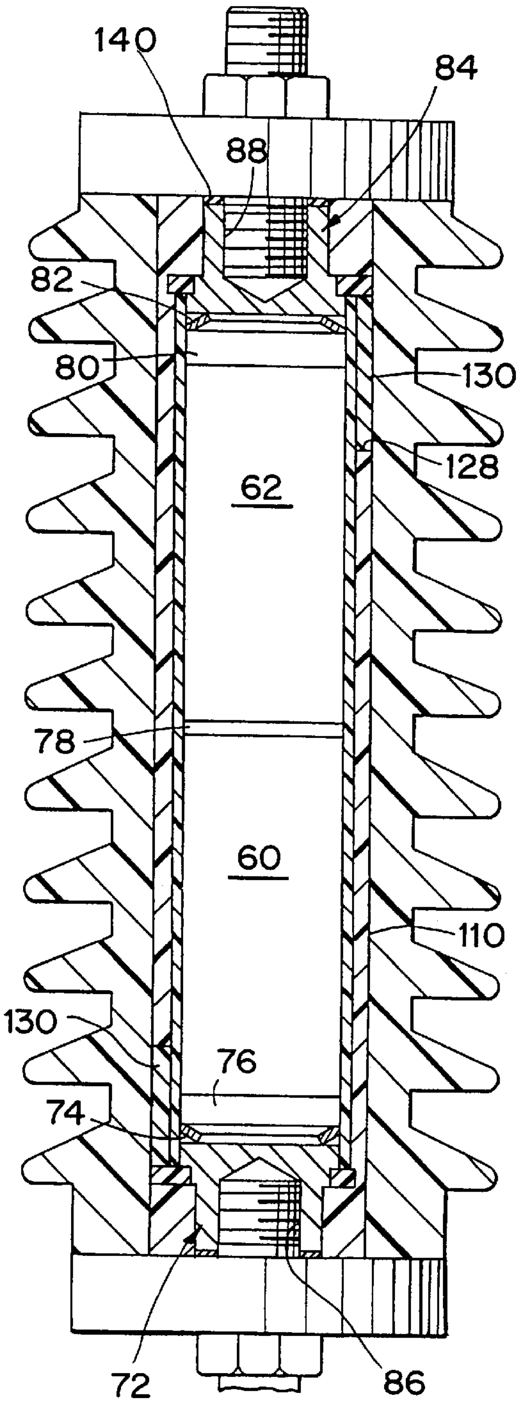
FIG. 2 is a side elevational view in longitudinal section of the assembly illustrated in FIG. 1.

Referring to FIGS. 1 and 2, an electrical device 50, in the form of a surge arrester, according to the present invention is formed of a modular electrical assembly 52, enclosed in a polymeric, elastomeric weathershed housing 58. The illustrated electrical assembly can be advantageously substantially identical to and interchangeable with the other electrical assemblies, and is in turn formed from one or a plurality of cylindrical electrical components 60 and 62.

These components are aligned in a row or column, and are in electrical connection with one another through their axially-directed ends and under an axially-directed compressive force developed by a non-conductive filament winding 64, as disclosed in U.S. Pat. Nos. 4,656,555 and 5,043,838. The electrical components can be metal oxide varistors (e.g., zinc oxide varistor blocks), resistors, capacitors, or any combination thereof.

In the case of varistors used to form a surge arrester, voltage ratings can be enlarged merely by serially and selectively coupling the plurality of modular electrical assemblies together mechanically and electrically.

The elastomeric weathershed housing 58 receives the electrical assemblies therein via a slight interference fit. This facilitates construction and allows the practice of good dielectric design by reducing radial gaps.

Electrical assembly 52 has a substantially cylindrical overall outer surface and comprises first end member or terminal 72, spring washer 74, contact disc 76, electrical component 60, contact disc 78, electrical component 62, contact disc 80, spring washer 82, and second end member or terminal 84. Additional spring washers can be employed in the electrical assembly against the contact discs at some or all of the intermediate varistor joints, particularly for base mounted assemblies, to maintain contact pressure when the assembly bends under cantilever loading. The non-conductive filament winding 64 is coupled to end members 72 and 84, encloses the electrical components, and maintains them under an axially-directed force, which is augmented by the spring washers.

A plastic film barrier 110 laterally surrounding electrical components 60 and 62 is interposed coaxially between the electrical components and filament winding 64. Preferably, the plastic is Teflon, but could be polypropylene. The barrier is formed by wrapping a rectangular plastic sheet tightly about the electrical components and the adjacent portions of end members 72 and 84 in two layers before filament winding 64 is added. The thickness of the plastic sheet and of each layer is about 0.0005 to 0.0001 inch.

Since the plastic film barrier extends along the entire length of the electrical components and onto the end members, the plastic film barrier seals the electrical components from the epoxy or resin on the filament forming the winding. For surge arresters, this prevents the wet epoxy or resin on the filament from bonding to the fragile ceramic insulating collars on the metal oxide varistor blocks 60 and 62. Such bonding can be prevented by other adhesion blockers, such as silicone oil or grease.

End members 72 and 84 form internal terminals, have cylindrical exposed outer surfaces, and have opposite, first and second axially-directed planar ends with internally threaded sockets or bores 86 and 88 formed respectively therein. Socket 86 threadedly receives threaded end stud 90 which can be connected to an electrical power source and is in the form of a metallic, conductive bolt with an internally threaded nut 91. End plate 92 is received on end stud 90, tightly engages an end of the weathershed housing as seen in FIGS. 1 and 2 and is held in place via rigid nut 91 on the stud. For base mounting, a base plate with a bolt circle can be attached. A second end plate 96 is similarly positioned at the other end of the housing and is received on end stud 98 which is connected to ground and maintained thereon via internally threaded nut 99 on the stud. Studs 90 and 98 in essence form external terminals for the overall device 50.

Weathershed housing 58 has a through passageway in the form of a throughbore with an inwardly facing cylindrical surface 100 which tightly receives therein the outer cylindrical surface of the electrical assembly 52. The reception of the assembly in the throughbore is preferably via an interference fit with the assembly having an outer surface diameter that is about 2% to about 9% greater than the throughbore diameter and is substantially constant along its length. This reduces radial gaps and thus provides advantageous dielectric design.

The end members facilitate wrapping a non-conductive filament, e.g., glass in a pattern with diamond shaped lateral openings 128. Openings 128 are filled with a fracturable insulating material 130 having suitable insulating and mechanical characteristics, for example epoxy. Other suitable insulating materials include polyester, foam, rubber, silicone grease or gas, such as air. If the housing is molded about the electrical assembly wrap, the molded housing material can fill the openings.

The insulating material 130 fills the openings 128 to maintain the desired uniform cylindrical surface of assembly 52. However, insulating material 130 can readily break or separate upon the development of adequate internal pressure within the winding, which pressure exceeds the threshold level permitted by epoxy or other insulating material against rupture, to permit gas to vent.

Upon electrical component failure, gas is released developing tremendous gas pressure within the fiber filament winding. This pressure causes the epoxy or other insulating material to fracture and the gas to escape to the inside of weathershed housing 58. Due to the flexible and resilient nature of elastomeric weathershed housing 58, the housing will expand, permitting the gas to flow along the length of the housing inner surface and out its axial ends. The gas can also vent between adjacent housings in a stacked arrangement, or through a split in the elastomeric housing. Once the gas is released, the housing will contract and again tightly bear against assembly 52. Without this venting of the gas, the gas would be entrapped within the winding until the increasing gas pressure causes an explosion of the assembly. After venting, ionized gas causes an external arc bridging the damaged arrester to relieve the internal fault.

To provide sealing against water invasion, preferably a gasket 140 is interposed between each end member and the adjacent end plate, and silicone grease is interposed between each adjacent end plate and end member, between adjacent end members, and between the outer surfaces of the electrical assemblies and the inwardly facing surfaces of the throughbore in each weathershed housing section. Use of grease between the weathershed housing section and the electrical assembly aids in construction and assembly by reducing friction and also reduces any radial gaps therebetween.

Since end members or terminals 72 and 84 are identical, only one end member 72 will be described in detail. Referring particularly to FIGS. 3–7, end member 72 comprises an electrically conductive terminal hub or first part 150 and an electrically insulative terminal plate or second part 152.

As particularly illustrated in FIGS. 4 and 5, terminal hub or first part 150 comprises a cylindrical axial portion 154 with an outer end 156 and an inner end 158. A radially extending flange 160 is provided at inner end 158 of axial portion 154. The flange is annular in configuration and is oriented coaxially with the right circular cylindrical outer surface of axial portion 154.

An annular section 162 is provided on first part 150 at the juncture of axial portion 154 and radial flange 160. The annular section has a non-circular configuration with four linear segments 164 spaced by four curved segments 166. The transverse dimensions of the annular section are greater than the outside diameter of axial portion 154, but less than the outer surface of radial flange 160.

The first part is unitarily formed of metal. Suitable metals for forming the first part include ductile iron and aluminum.

Second part or terminal plate 152 is unitarily formed, typically by molding of a general purpose polyester plastic. The substantially annular configuration of the second part has an outer periphery 168 with a plurality of circumferentially spaced notches 170, and an inner periphery 172 of a non-circular configuration formed to mate with first part annular section 162 to prevent relative rotation between the first and second parts when the second part engages racial flange 160.

Each notch 170 comprises an outer section 174 and an inner section 176. Each outer section has a circumferential width which is less than the circumferential width of the respective inner section. Each outer section opens on outer periphery 168, while each inner section is spaced radially inwardly from outer periphery 168 and spaced radially outwardly from inner periphery 172. The circumferential ends of each inner section constitute curved or semi-cylindrical surfaces.

As illustrated particularly in FIGS. 2 and 3, second parts 152 are mounted on first parts 150 by sliding the second parts over axial portions 154 until a front o :r back surface of the second part is in surface-to-surface contact with radial flange 160. If necessary, the second part is rotated relative to the first part, prior to engagement of the second part with the radial flange, such that the linear segments 178 and the curved segments 180 of the second part inner periphery 172 are aligned with the linear segments 164 and curved segments 166, respectively, of the first part annular section 162. The engagement of second part inner periphery 172 and first part annular segment 162 provide a non-rotatable connection such that the first and second parts do not rotate relative to one another.

Advantageously, the longitudinal axes of the studs, the electrical components in each assembly, and the weathershed housing 58 are coaxially aligned. Preferably, the planar ends of the end members are perpendicular to these aligned longitudinal axes.

Preferably, with regard to the electrical device 50, the axial load on the electrical components before winding is about 750 pounds per square inch, and the filament or stranded element of fibers is wet, epoxy coated fiberglass which is wound through about 100 turns and is cured for about two hours at 150° C.

While a particular embodiment has been chosen to illustrate the invention, it will be understood by those skilled in the art that various changes and modifications can be made therein without departing from the scope of the invention as defined in the appended claims.

What is claimed is:

1. An end terminal for a modular electrical assembly, comprising:

an electrically conductive first part having an axially extending portion with inner and outer electrically conductive axial ends, and having a radially extending flange at said inner end; and an electrically insulative second part mounted over said axially extending portion and engaging said flange, while leaving said inner and outer ends exposed for electrical connection of electrical components thereto, said second part being substantially annular with an inner radial periphery and an outer radial periphery and having a plurality of circumferentially spaced notches extending radially into said second part from and opening on said outer periphery.

2. An end terminal according to claim 1 wherein each of said notches comprises an outer section at said outer periphery and an inner section spaced inwardly from said outer periphery, each said inner section being wider than the respective outer section in a circumferential direction.

3. An end terminal according to claim 2 wherein each said inner section extends circumferentially from each side of the respective outer sections.

4. An end terminal according to claim 1 wherein said first and second parts are connected to prevent relative rotation when said second part engages said flange.

5. An end terminal according to claim 4 wherein said second part is substantially annular with an inner periphery and an outer periphery, said inner periphery having a non-circular configuration; and said first part comprises an annular section at a juncture of said axially extending portion with said flange, said annular section having a non-circular configuration mating with said non-circular configuration of said inner periphery.

6. An end terminal according to claim 5 wherein each of said non-circular configurations comprises linear segments which are angularly oriented.

7. An end terminal according to claim 1 wherein said first part comprises an internally threaded bore opening on said outer end.

8. An end terminal according to claim 1 wherein said second part is axially spaced from said inner and outer ends of said first part.

9. A modular electrical assembly, comprising:

a plurality of conductive electrical components, aligned in a column and having axially directed ends, said electrical components being electrically connected at said axially directed ends;

first and second end terminals located at opposite ends of said column, each of said end terminals having an electrically conductive first part and an electrically insulative second part, each said first part having an axial portion with inner and outer electrically conductive ends and having a radially extending flange at said inner ends thereof, each said second part being mounted over the respective axial portion and engaging said flange thereof while leaving said inner ends exposed for connection to said electrical components and said outer ends exposed for connection to electrical devices; and a non-conductive filament winding wrapped in a predetermined pattern longitudinally and crosswise about said electrical components and said end terminals and applying an axially directed compressive force through said second parts and said flanges to compress said electrical components and said end terminals to maintain electrical connection therebetween, said winding defining a pattern forming lateral openings therein for venting gas upon failure of one of said electrical components.

10. A modular electrical assembly according to claim 9 wherein said electrical components are varistors.

11. A modular electrical assembly according to claim 10 wherein said varistors are generally cylindrical metal oxide varistors.

12. A modular electrical assembly according to claim 9 wherein said electrical components are generally cylindrical varistor blocks; and said flanges of said end terminals are annular and have substantially equal transverse diameters with said varistor blocks.

13. A modular electrical assembly according to claim 9 wherein said second part is substantially annular with an inner periphery and an outer periphery; and a plurality of circumferentially spaced notches extend into said second part from and open on said outer periphery.

14. A modular electrical assembly according to claim 13 wherein each of said notches comprises an outer section at said outer periphery and an inner section spaced inwardly from said outer periphery, each said inner section being wider than the respective outer section in a circumferential direction.

15. A modular electrical assembly according to claim 14 wherein each said inner section extends circumferentially from each side of the respective outer sections.

16. A modular electrical assembly according to claim 9 wherein said first and second parts are connected to prevent relative rotation when each said second part engages the respective flange.

17. A modular electrical assembly according to claim 9 wherein each said second part is substantially annular with an inner periphery and an outer periphery, each said inner periphery having a non-circular configuration; and each said first part comprises an annular section at a juncture of said axially extending portion with said flange thereof, each said annular section having a non-circular configuration mating with said non-circular configuration of said inner periphery of the respective second part.

18. A modular electrical assembly according to claim 17 wherein each of said non-circular configurations comprises linear segments which are angularly oriented.

19. A modular electrical assembly according to claim 9 wherein each said second part is axially spaced from said inner and outer ends of the respective first part.

20. A surge arrester, comprising:

a plurality of generally cylindrical, metal oxide varistor blocks aligned in a column and having axially directed ends, said varistor blocks being in electrical connection with one another through said axially directed ends;

first and second end terminals at opposite ends of said column, each said terminal having an electrically conductive terminal hub and an electrically insulative terminal plate, each said terminal hub having an axial portion with inner and outer ends and having a radial flange at said inner end thereof in contact with one of said varistor blocks, each said outer end having an internally threaded socket, said varistor blocks and said radial flanges having substantially equal transverse diameters, each said terminal plate being mounted over the respective axial portion and engaging said flange thereof;

compression means, wrapped around said varistor blocks and said terminals in a crisscross pattern, for applying an axially-directed compressive force through said terminal plates and said flanges on said varistor blocks and said terminals to maintain electrical connection thereof, said compression means including a non-conductive filament winding, said pattern defining lateral openings in said filament winding for venting gas upon failure of one of said varistor blocks; and an elastomeric weathershed housing enclosing said varistor blocks and having a substantially cylindrical throughbore with a diameter substantially equal to transverse diameters of said compression means.

21. A surge arrester according to claim 20 wherein said openings are filled with fracturable insulating material.

22. A surge arrester according to claim 20 wherein said, housing has an internal throughbore forming an interference fit with said filament winding.

* * * * *